Patented Mar. 27, 1923.

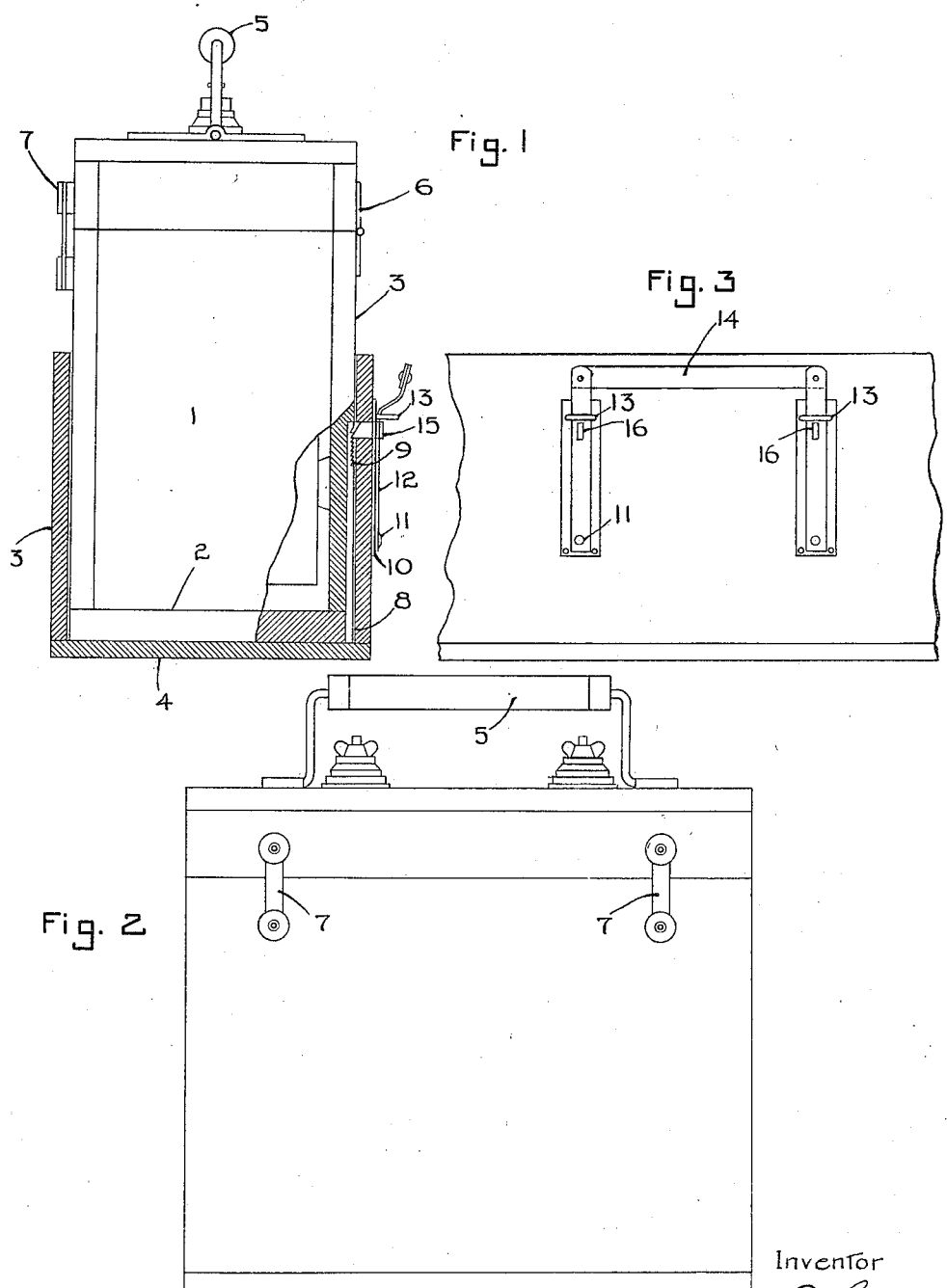

1,450,034

UNITED STATES PATENT OFFICE.

GEORGE F. GRAY, OF MAHWAH, NEW JERSEY.

BATTERY-BOX FASTENER.

Application filed October 4, 1919. Serial No. 328,546.

*To all whom it may concern:*

Be it known that I, GEORGE F. GRAY, a citizen of the United States, residing at Mahwah, in the county of Bergen and State of New Jersey, have invented certain new and useful Improvements in Battery-Box Fasteners, of which the following is a specification.

This invention relates to an improved fastener for retaining an article in a stationary receptacle and is particularly adapted to be used for the purpose of retaining batteries in fixed boxes as used on an airplane.

One object of the invention is the employment of means to retain the battery boxes in an upright position and to prevent accidental displacement of the same.

Another object of the invention is to provide a positive locking means that is simple in construction and avoids the use of straps and buckles which have proved so cumbersome and complicated in devices of this nature.

With these and other objects in view, the invention consists in the construction, combination and arrangement of parts as will be hereinafter fully described and illustrated in the accompanying drawing and pointed out in the claims hereto appended.

In the accompanying drawings which show the preferred embodiment of my invention and to which reference is herein had to like characters designating corresponding parts throughout these several views:—

Fig. 1 is a vertical sectional view showing the battery box mounted in a receptacle for holding the same and the improved fastening device.

Fig. 2 is a front elevation showing the battery box and the employment of a handle for holding the same and locking means for retaining the batteries in the battery box.

Fig. 3 is a rear elevation showing in detail the fastening element as attached to the battery box.

Referring more particularly to the drawing, the invention comprises a battery box 1 which is enclosed in a receptacle 2, the side walls 3 and the bottom wall 4 of the same being shown to advantage in Fig. 1. A handle 5 is employed to lift the battery box 1 from the receptacle 2 and for the purpose also of carrying the battery box 1 from place to place. At one side of the battery box 1 there is disposed a hinge 6, and at the opposite side thereof there is provided a locking element 7.

Suitably attached to one side of the battery box 1 there are a pair of metal strips 8, which are serrated adjacent their upper ends, as indicated at 9. To one side wall of the receptacle 2 there are attached a pair of metal plates 10, to which in turn are fixed, by means of rivets 11 or other suitable fastening means, a pair of metal spring strips 12 and also a pair of staples 13, the purpose of which will be hereinafter described. The metal spring strips 12 are bent at a point adjacent their upper ends and have a cross-bar 14 connecting them near the upper ends thereof. At a point approximately two-thirds the length of the metal spring strips there are placed beveled teeth 15 which penetrate the metal plates 10 through orifices 16 and contact with the serrated portions of the metal strips 8 and form a locking device by meshing with the same.

The staples 13 mounted on the metal plates 10 serve to limit the outward movement of the metal spring strips 12 when the beveled teeth 15 are withdrawn from contact with the serrated portions 9 of the metal strips 8 and also serve to prevent the beveled teeth 15 from passing from the orifices 16. The purpose of the cross-bar 14 is to enable the operator of the device to withdraw the beveled teeth 15 from contact with the metal strips 10 to allow the passage of the battery box 1 from the receptacle 2.

The operation of the device may be briefly described as follows: When the battery is placed in the battery box, which in turn is mounted in a suitable place on an airplane, the battery box 1 is inserted in the receptacle 2 and fits snugly into place. Now when the box has reached the bottom wall of the receptacle, the beveled teeth 15, being returned to their normal position through the action of the spring strips 12, will contact with the serrated portion 9 of the metal strips 8 and accordingly the box will be locked within the receptacle. When the operator desires to withdraw the battery box 1 from the receptacle 2 he grasps the handle 14 and the elastic action of the spring strips 12 will cause the beveled teeth 15 to be withdrawn from contact with the serrated portion 10 of the metal strips 8 and the battery box 1 can be accordingly withdrawn from the receptacle 2.

While the accompanying drawings illustrate the preferred embodiment of my invention, I do not wish to be confined thereto, as various forms, modifications and arrangement of the parts as shown may be had without departing from the spirit of the invention as claimed.

What I claim as new is:

1. A receptacle for retaining a battery box therein, comprising metal serrated strips attached to said box, metal plates fixed to said receptacle, spring strips attached to said metal plates at a point adjacent the lower end thereof, said spring strips terminating in angular portions adjacent the upper end thereof and provided with beveled teeth at a point near the bent portions of said spring strips, and a horizontal cross-bar connecting said spring strips to permit the withdrawal of the beveled teeth from contact with said serrated strips to allow the passage of the box from said receptacle.

2. A receptacle for retaining a battery box therein, comprising metal serrated strips attached to said box, metal plates fixed to said receptacle, bent spring strips attached to said metal plates, said spring strips terminating in angular portions adjacent the upper end thereof and provided with beveled teeth at a point near the bent portions of said spring strips, said metal plates having orifices therein to permit the entrance and contact of the beveled teeth with the serrated portions of the metal strips, and a horizontal cross-bar connecting said spring strips to permit the withdrawal of said beveled teeth from contact with said serrated strips to thereby allow the passage of said box from said receptacle.

3. A receptacle for retaining a battery box therein, comprising metal serrated strips attached to said box, metal plates fixed to said receptacle, and spring strips fixed to said metal plates adjacent the lower end thereof and terminating in angular portions adjacent the upper end thereof and provided with beveled teeth at a point near the bent portion of said spring strips, staples mounted on said metal strips to limit the movement of said spring strips, and a horizontal cross-bar connecting said spring strips to permit the withdrawal of the said beveled teeth from contact with the said serrated strips to allow the passage of said box from said receptacle.

4. A receptacle for holding a battery box, said receptacle being of box-like formation open at the top, a plurality of battery box-retaining spring catches mounted on said receptacle in spaced relation to each other, and a common operating bar fixedly attached to and connecting said spring catches for simultaneous operation thereof.

In testimony whereof I have affixed my signature.

GEORGE F. GRAY.